(12) United States Patent
Cowelchuk et al.

(10) Patent No.: US 7,572,401 B2
(45) Date of Patent: Aug. 11, 2009

(54) INSERT MOLDED BOLSTER IN TWO-SHOT DOOR PANEL

(75) Inventors: Glenn A. Cowelchuk, Chesterfield Township, MI (US); Todd L. DePue, Brighton, MI (US); David J. Dooley, Troy, MI (US); Randy S. Reed, Fair Haven, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 404 days.

(21) Appl. No.: 11/162,618

(22) Filed: Sep. 16, 2005

(65) Prior Publication Data

US 2007/0065648 A1 Mar. 22, 2007

(51) Int. Cl.
*B29C 70/68* (2006.01)
*B29C 39/12* (2006.01)
*B29C 5/00* (2006.01)
*B28B 7/22* (2006.01)

(52) U.S. Cl. ............... 264/241; 264/245; 264/246; 264/247; 264/250; 264/255

(58) Field of Classification Search ............... 280/730.1, 280/730.2, 743.1; 273/149 R; 296/146.7, 296/153, 216.13; 188/107; 428/212
See application file for complete search history.

(56) References Cited

U.S. PATENT DOCUMENTS

| | | | |
|---|---|---|---|
| 4,952,358 A | 8/1990 | Okina et al. | |
| 5,089,328 A | 2/1992 | Doerer et al. | |
| 5,407,510 A | 4/1995 | Marfilius et al. | |
| 5,571,355 A * | 11/1996 | Kornylo | 156/78 |
| 5,622,402 A * | 4/1997 | Pritchard et al. | 296/191 |
| 5,743,982 A | 4/1998 | Marfilius et al. | |
| 5,824,251 A * | 10/1998 | Morrison et al. | 264/259 |
| 6,156,682 A | 12/2000 | Fletemier et al. | |
| 6,210,613 B1 * | 4/2001 | Stein et al. | 264/45.4 |
| 6,296,797 B1 * | 10/2001 | Ziegler et al. | 264/255 |
| 6,413,461 B1 * | 7/2002 | Kobayashi et al. | 264/257 |
| 6,710,131 B2 * | 3/2004 | Sodagudi et al. | 525/191 |
| 2003/0218356 A1 * | 11/2003 | Emerling et al. | 296/146.1 |

* cited by examiner

*Primary Examiner*—David R Sample
*Assistant Examiner*—Michael B Nelson
(74) *Attorney, Agent, or Firm*—Brooks Kushman P.C.

(57) ABSTRACT

In at least certain embodiments, the present invention relates to automobile interior door panel having an insert molded bolster. In at least one embodiment, the automobile interior door panel is made by providing a bolster within a first mold cavity, introducing a first resin into the first mold cavity to form a door panel sub assembly comprising a door panel portion secured to the bolster, with the door panel portion having a first upper door panel portion above the bolster and a lower door panel portion below the bolster, providing the door panel sub assembly within a second mold cavity, and introducing a second resin less rigid that the first material into the second mold cavity to form a second upper door panel portion over and secured to the first upper door panel portion.

16 Claims, 7 Drawing Sheets

INSERT MOLDED BOLSTER IN TWO-SHOT DOOR PANEL

BACKGROUND OF THE INVENTION

1. Field of the Invention

The present invention is related to a two-shot door panel with an insert molded bolster.

2. Background Art

Motor vehicle interiors have many interior components made of trim panels. One of the more relatively common types of interior components is an interior door panel.

Some of the more common interior door panels comprise a rigid door panel substrate and a relatively soft bolster. In these types of door panels the bolster is typically disposed above an armrest of the door panel and below an upper edge of a door. While the bolster typically provides a decorative and/or soft area to a portion of the door panel above the armrest, the remainder of the door panel above the arm rest remains relatively rigid, especially in contrast to the bolster area. Such a contrast can be aesthetically and functionally (such as tactilely) displeasing to some discerning customers.

Moreover, in a typical door panel manufacturing process, the bolster, the rigid upper door panel, and the rigid lower door panel substrate are formed separately and heat staked or attached via other suitable attachment mechanisms to form a door panel. Such a manufacturing process requires a secondary operation such as heat staking. Also, due to the inherent give between heat, the staked bolster and the door substrate, rattling and squeaking can occur during operation of the vehicle.

Accordingly, it would be desireable to provide a door panel having a bolster which would overcome at least one of the deficiencies in the prior art.

SUMMARY OF THE INVENTION

According to one aspect of the present invention, a method of making an automobile interior panel is provided. In at least one embodiment, the method comprises a) providing a molding tool comprising a first mold half and a second mold half, with the first and second mold halves cooperating to form a first mold cavity. The method further comprises b) providing a bolster within the first mold cavity, with the first mold half, the second mold half, and the bolster cooperating to form a second mold cavity, and c) introducing a first resin into the second mold cavity to form a door panel sub assembly comprising a door panel portion secured to the bolster, with the door panel portion having a first upper door panel portion above the bolster and a lower door panel portion below the bolster. The method further comprises d) providing the door panel sub assembly within the first mold half and a third mold half, with the first mold half, the third mold half, and the door panel sub assembly forming a third mold cavity, and e) introducing a second resin less rigid that the first material into the third mold cavity to form a second upper door panel portion over and secured to the first upper door panel portion.

In at least one embodiment of the present invention, the first resin comprises a thermoplastic resin. In at least another embodiment of the present invention, the first resin is selected from the group consisting of thermoplastic polyurethanes, thermoplastic olefins, polyvinyl chloride, polypropylene, and combinations thereof. In at least yet another embodiment of the present invention, the first resin is selected from the group consisting of homopolymers and copolymers of polyethylene, homopolymers and copolymers of polypropylene, filled polypropylene, polycarbonate, acrylonitrile butadiene styrene, mixed acrylonitrile butadiene styrene and polycarbonate, and combinations thereof.

In at least one embodiment, the first resin is injected into the mold cavity at a temperature from 350° F. to 440° F. and a pressure from about 200 psi to about 2100 psi.

In at least one embodiment of the present invention, the second resin comprises a thermoplastic resin. In at least another embodiment of the present invention, the second resin is selected from the group consisting of homopolymers and copolymers of polyethylene, homopolymers and copolymers of polypropylene, filled polypropylene, thermoplastic olefins, thermoplastic urethanes, polycarbonate, acrylonitrile butadiene styrene, mixed acrylonitrile butadiene styrene and polycarbonate, and combinations thereof. In yet another embodiment of the present invention, the second resin comprises an elastomer. In still yet another embodiment of the present invention, the second thermoplastic resin is selected from the group consisting of thermoplastic elastomers, styrene-ethylene-butylene-styrene elastomers, blocked copolymer thermoplastic elastomers, polyolefin-based elastomers, foamed thermoplastic elastomers, and combinations thereof.

In at one embodiment of the present invention, the second resin is injected into the mold cavity at a temperature from about 350° F. to about 440° F. and a pressure from about 200 psi to about 2100 psi.

In at least one embodiment of the present invention, the bolster comprises a rigid substrate and a decorative portion secured to the rigid substrate, with the decorative portion being made of a soft material less rigid that the material of the rigid substrate.

According to yet another aspect of the present invention, an automobile door panel is provided. In at least one embodiment, the automobile door panel is made in accordance with the method described above.

In yet another embodiment, the method of making an interior panel comprises a) positioning a bolster within a first mold cavity of a molding tool, with the first mold cavity and the bolster forming a second mold cavity, and b) introducing a first resin into the second mold cavity to form a door panel sub assembly, with the door panel sub assembly comprising a door panel portion secured to the bolster and having a first upper door panel portion generally above the bolster and a lower door panel portion generally below the bolster. The method further comprises c) positioning the door panel sub assembly within a third mold cavity, with the third mold cavity and the door panel sub assembly forming a fourth mold cavity, and d) introducing a second resin less rigid that the first resin into the fourth mold cavity to form a second upper door panel portion over and secured to the first upper door panel portion to form an automotive interior door panel.

In still yet another embodiment of the present invention, the method of making an interior panel comprises providing a bolster within a first mold cavity and introducing a first resin into the first mold cavity to form a door panel sub assembly comprising a door panel portion secured to the bolster. In this embodiment, the door panel portion has a first upper door panel portion above the bolster and a lower door panel portion below the bolster. The method further comprises providing the door panel sub assembly within a second mold cavity, and introducing a second resin less rigid that the first material into the second mold cavity to form a second upper door panel portion over and secured to the first upper door panel portion.

In yet another embodiment of the present invention, an automobile interior door panel is provided comprising a bolster, a door panel portion secured to the bolster having a first upper door panel portion generally above the bolster and a lower door panel portion generally below the bolster, with the door panel portion being made of a first rigid resin. The door panel further comprises a second upper door panel portion disposed over and secured to the first upper door panel portion, with the second upper door panel portion being made of a second resin less rigid than the first resin.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various alternative forms. The figures are not necessarily of scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of materials as suitable preferred for a given purpose in connection with the invention implies that mixtures of any two or more members of the group or class may be equally suitable or preferred.

Figure 1:
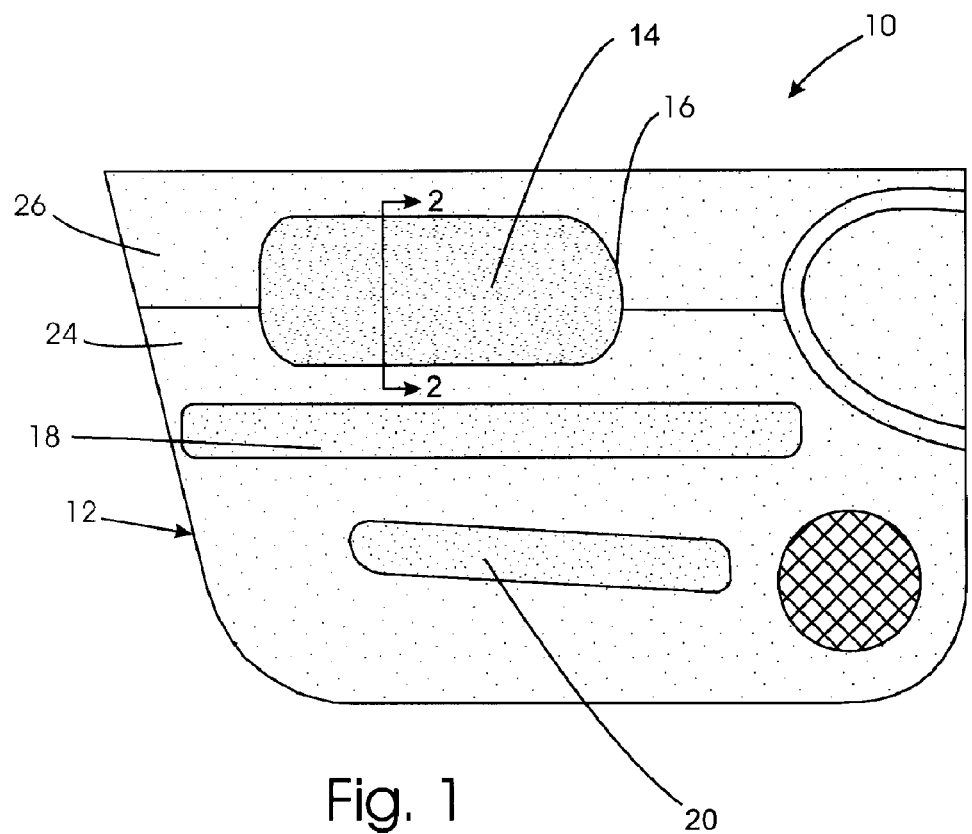
FIG. 1 is an idealized side view of an automobile interior panel made by the method of the invention.

FIG. 1 shows an interior door panel 10 in accordance with at least one embodiment of the present invention. Certain aspects of the present invention will be described below in connection with the door panel 10. However, it should be understood that other trim products, such as instrument panels, glove box door covers, console sides, console covers, pillar trim panels, shelves, trim covers and the like may also enjoy the benefits of the present invention.

Figure 2:
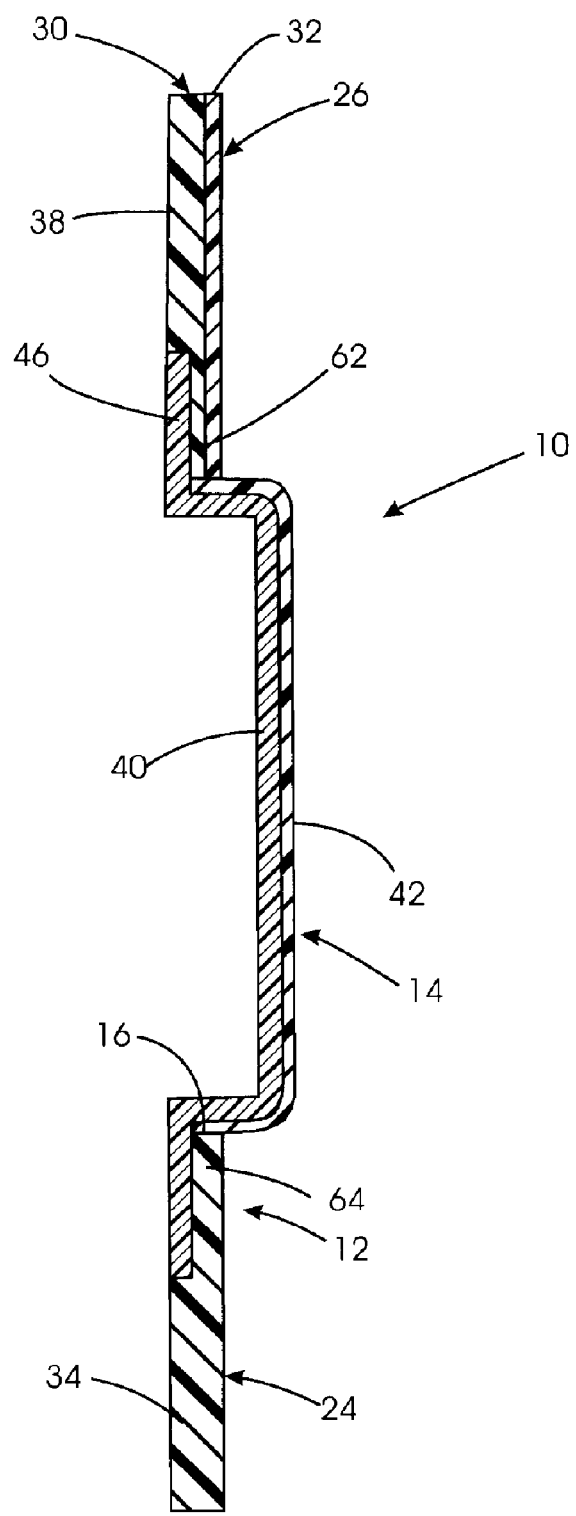
FIG. 2 is a fragmentary sectional view of the automobile interior panel shown in FIG. 1, taken through line 2-2.

Referring to FIGS. 1 and 2, door panel 10 includes a major panel 12 which may also include additional structures attached thereto. The door panel 10 also includes a bolster 14 attached to the major panel 12. The major panel 12 is made of resinous material and includes an opening 16, as best seen in FIG. 2. The bolster 14 when attached to the major panel 12 essentially covers the opening 16.

Referring again to FIG. 1, the door panel 10 can also include additional components such as an armrest 18 and a map pocket 20. The door panel 10 includes a lower door panel portion 24 and an upper door panel portion 26. While the primary line of demarcation between the lower door panel portion 24 and the upper door panel portion 26 is shown in FIG. 1 to be roughly at the mid point of the bolster 14, the door panel 10 could be configured such that the line of demarcation between portions 24 and 26 can be at any desired location.

With reference to FIG. 2, the upper door panel portion 26 includes a first relatively rigid upper panel portion 30 and a second less rigid upper panel portion 32. The first upper panel portion 30 is integral with and made of the same relatively rigid material as the lower panel portion 24. The first upper panel portion 30 and the lower panel portion 24 together form the major door panel 12. In the illustrated embodiment, the first upper panel portion 30 is roughly one-half the thickness of the lower panel portion 24, however these relative thicknesses can vary as desired. For instance, the first upper panel portion 30 can be the same, or even a greater, thickness than the lower portion 24. The second upper panel portion 32 is made of a less rigid material than the first upper panel portion 30. The second upper panel portion 32 is disposed over, and in at least one embodiment, covers the first upper panel portion 30. This is to provide a soft feel and/or a contrasting color to the upper door panel portion 26 relative to the lower door panel portion 24.

In the illustrated embodiments, the lower panel portion 24 includes a main lower panel portion 34 and a lower panel finger portion 64. In the illustrated embodiments, the main lower panel portion 34 is generally twice as thick as the lower panel finger portion 64, however, these relative thicknesses can vary as desired. For instance, the lower panel finger portion 64 can be the same, or even greater, thickness than the main lower panel portion 34. In at least one embodiment, the main lower panel portion 34 has a thickness of 1-5 mm, and in other embodiments of 2.5-3.5 mm. In at least one embodiment, the lower panel finger portion 64 has a thickness of 1-5 mm, and in other embodiments of 2.5-3.5 mm.

In the illustrated embodiments, the first upper panel portion 30 includes a main upper panel portion 38 and an upper panel finger portion 62. In the illustrated embodiments, the main upper panel portion 38 is generally twice as thick as the upper panel finger portion 62, however, these relative thicknesses can vary as desired. For instance, the upper panel finger portion 62 can be the same, or even a greater, thickness than the main upper panel portion 38. In at least one embodiment, the main upper panel portion 38 has a thickness of 1-5 mm, and in other embodiments of 2.5-3.5 mm. In at least one embodiment, the upper panel finger portion 62 has a thickness of 1-5 mm, and in other embodiments of 2.5-3.5 mm.

In at least one embodiment, the second upper panel portion 32 has a thickness of 0.5-3 mm, and in other embodiments of 1-1.5 mm. In at least one embodiment, the combined thickness of the first and second upper panel portions 30 and 32 is roughly the same as the thickness of the lower panel portion 24, however these relative thickness can vary as desired. For instance, the combined thickness of portions 30 and 32 could be greater or less than the thickness of portion 24. While the second upper panel portion 32 is shown to cover only the first upper panel portion 30, it should be understood that the second upper panel portion 32 could cover more or less than the first upper panel portion 30.

Figure 3:
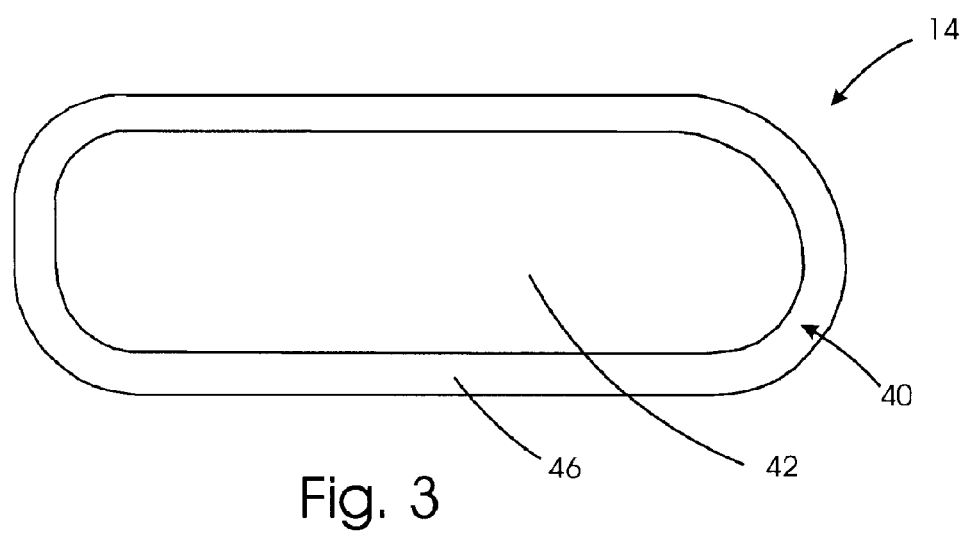
FIG. 3 illustrates a top view of a component illustrated in FIG. 1.
Figure 4:
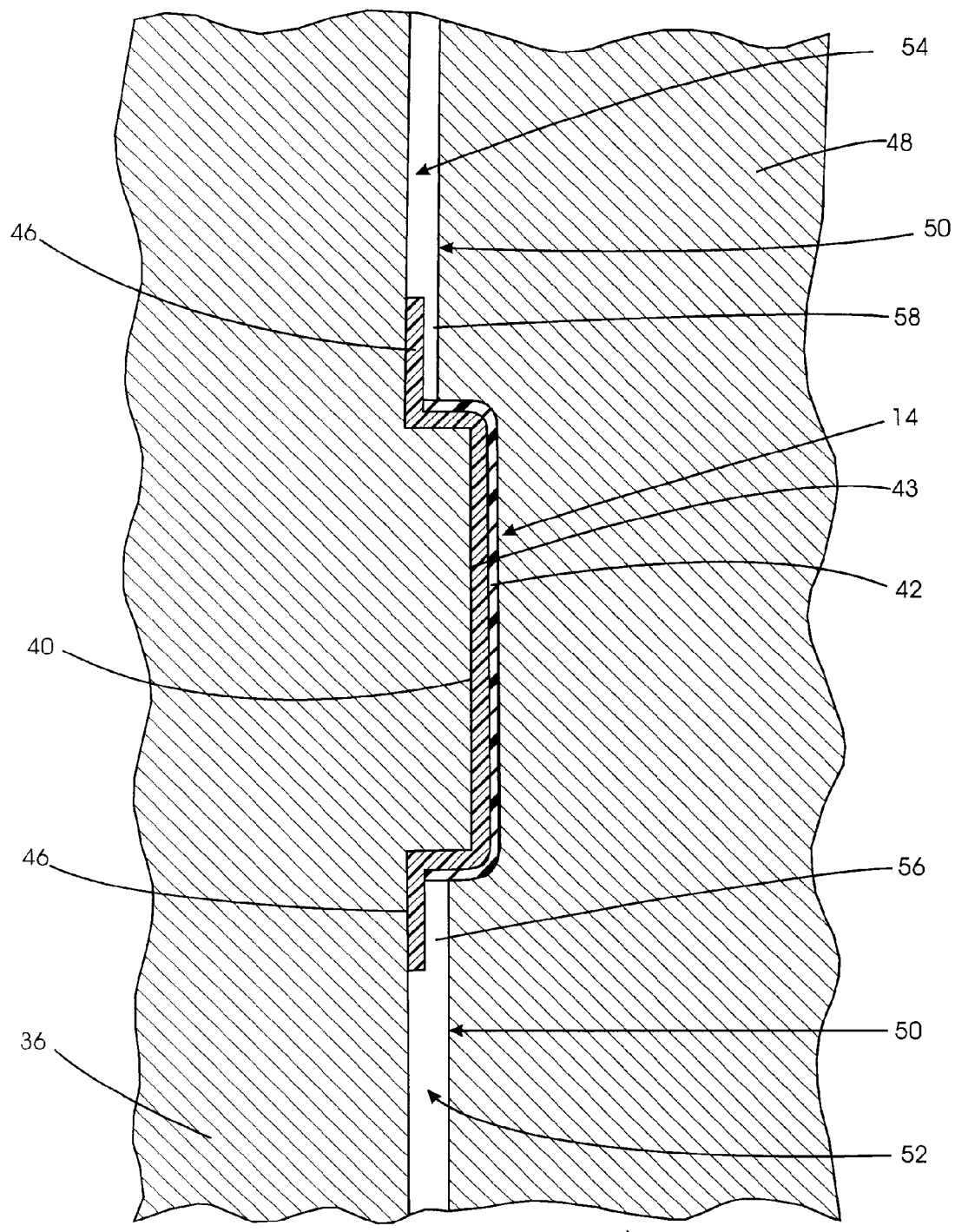
FIG. 4 is an illustration of a mold cooperating with the component to FIG. 3 to form a mold cavity.

With reference to FIGS. 2, 3 and 4, the bolster 14 in the illustrated embodiment includes a bolster substrate 40 and a cover layer 42 attached to the bolster substrate 40. The bolster cover 42 is shown in the illustrated embodiments to cover less than the entire upper surface of bolster substrate 40. For instance, flange portion 46 of the bolster 14 can be uncovered as shown. However it should be understood that bolster cover 42 could cover the entire upper surface, including the flange 46, of the bolster substrate 40. In the illustrated embodiments, the bolster cover 42 extends over less than the entire upper surface of the substrate 40 to help facilitate securement of the bolster 14 to the major panel 12 via bonding of the bolster substrate 40, such as the flange 46 as is shown, to the major panel 12, and more specifically to the main upper and lower panel portions 38 and 34, respectively, and the upper and lower panel finger portions 62 and 64, respectively. However, it should be appreciated that at least some of the circumferential portion of the bolster cover 42 between the finger portions 62 and 64 could be removed to further facilitate bonding (i.e., provide additional bonding surface area) of the bolster 14 to the major panel 12. Moreover, it should be appreciated that the bolster 14 could be secured to the major panel 12 via other means, such as using molded projections. The bolster substrate 40 can be made of any suitable resin such as a relatively hard, relatively rigid resin and can take any suitable form.

Referring to FIG. 4, a method of making a door panel 10 in accordance with the present invention will be described. FIG. 4 illustrates a mold tool 22 having core half 36 and a first cavity half 48. The core half 36 has a surface 43 for receipt of the bolster 14. The mold tool 22 may include moveable lifters (not shown) to help hold the bolster 14 in place during molding of the major panel 12. In other embodiments, a vacuum or other holding means could be used in place of or in addition to the lifters.

As shown in FIG. 4, when mold tool 22 is closed (i.e. core half 36 and cavity half 48 are brought together to contact the bolster 14), a cavity 50 is formed within the mold tool 22. In the illustrated embodiment, the cavity 50 has a lower portion 52 and an upper portion 54. In the illustrated embodiment, the upper portion 54 is roughly one-half the thickness of the lower portion 52 but these relative thicknesses can vary as desired. For instance, upper portion 54 can be the same, or even a greater, thickness as upper portion 54 of the cavity 50. In the illustrated embodiment, each of the portions 52 and 54 of the cavity 50 have a finger portion 56 and 58, respectively, that extends over the flange 46 of the bolster substrate 40 of the bolster 14.

Figure 5:
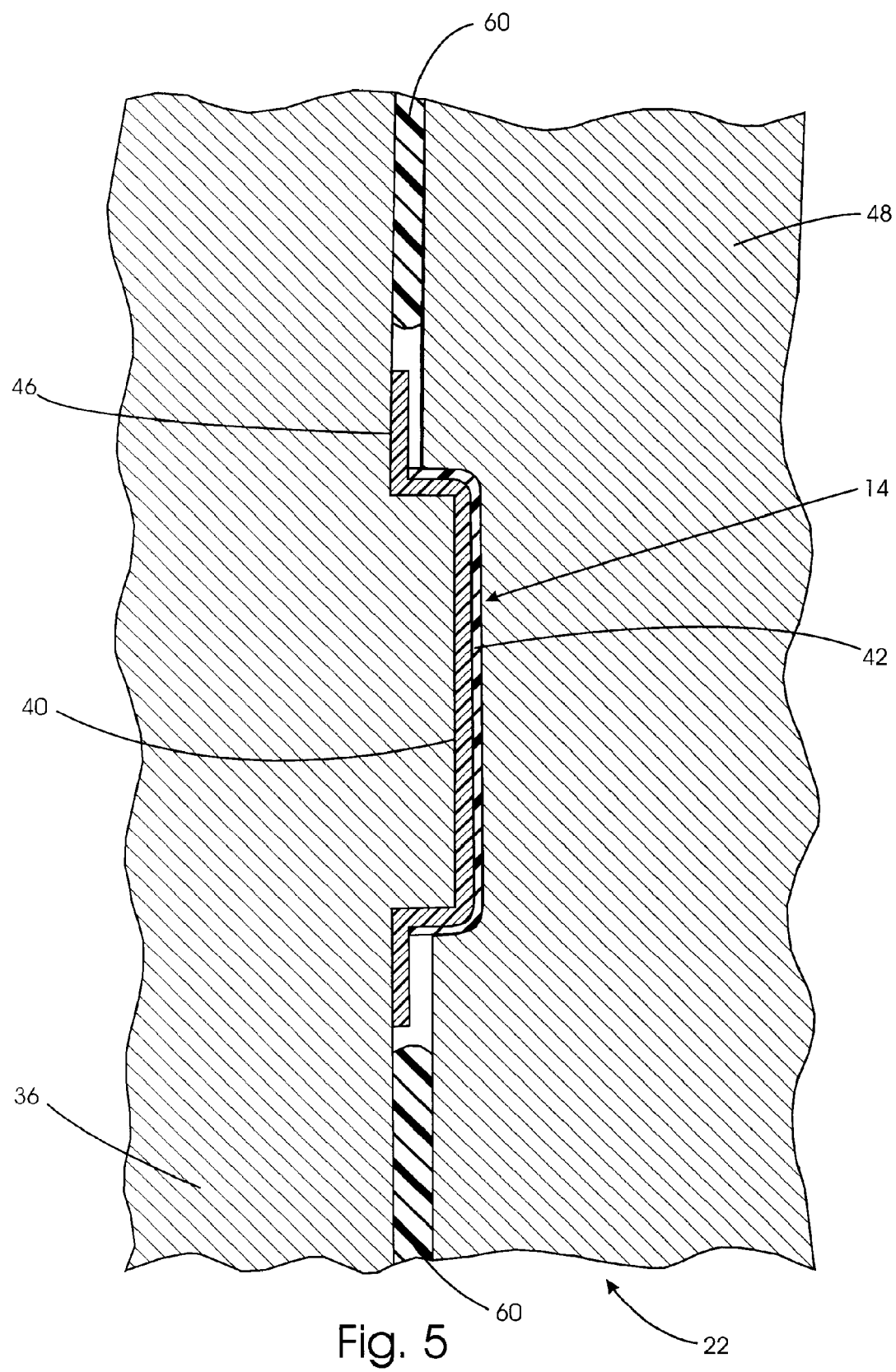
FIG. 5 is a view similar to FIG. 4 showing the introduction of resin into the mold cavity.
Figure 6:
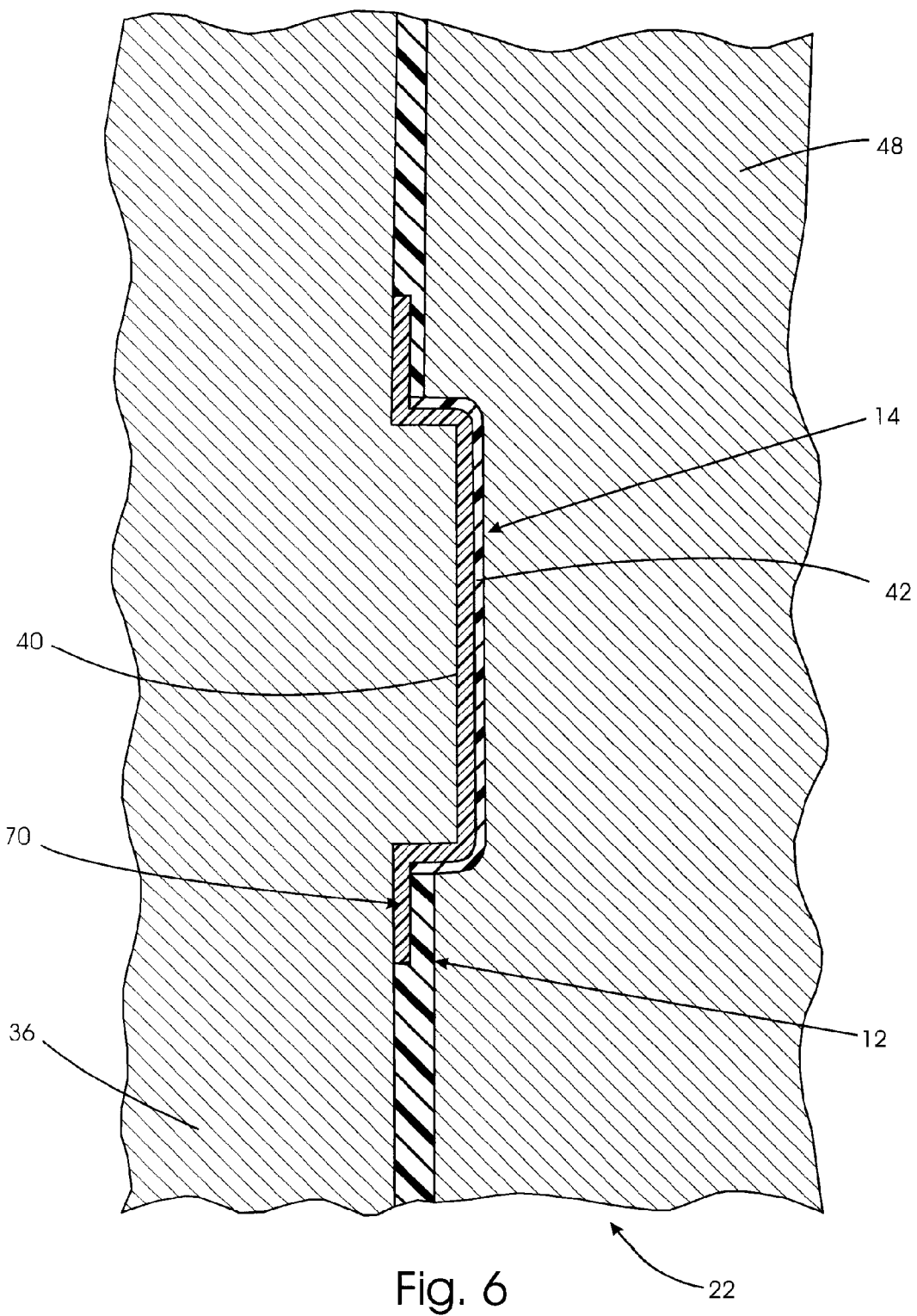
FIG. 6 is a view similar to FIG. 5 showing a subassembly.

Next, referring to FIG. 5, resin 60 is introduced into the mold cavity 50. Typically, the resin 60 is injected into the mold cavity 50 at a temperature from about 350° F. to about 440° F. and a pressure from about 200 psi to about 2100 psi. It should be appreciated that these temperature and pressure ranges will vary depending on the materials used. The resin 60 flows through the mold cavity 50 filling the mold cavity 50 including the finger portions 56 and 58, as can be understood from FIG. 6. The resin 60 upon cooling, or curing, forms major panel 12, as best shown in FIG. 2. In at least one embodiment, the resin that cools in the finger portions 56 and 58 forms the projections 62 and 64 that overlie and bond to bolster substrate 40. As shown in the figures, finger 62 is roughly one-half the thickness of finger 64, however these relative thicknesses may vary as desired. For instance, finger 62 could be the same or a greater thickness as finger 64.

Figure 7:
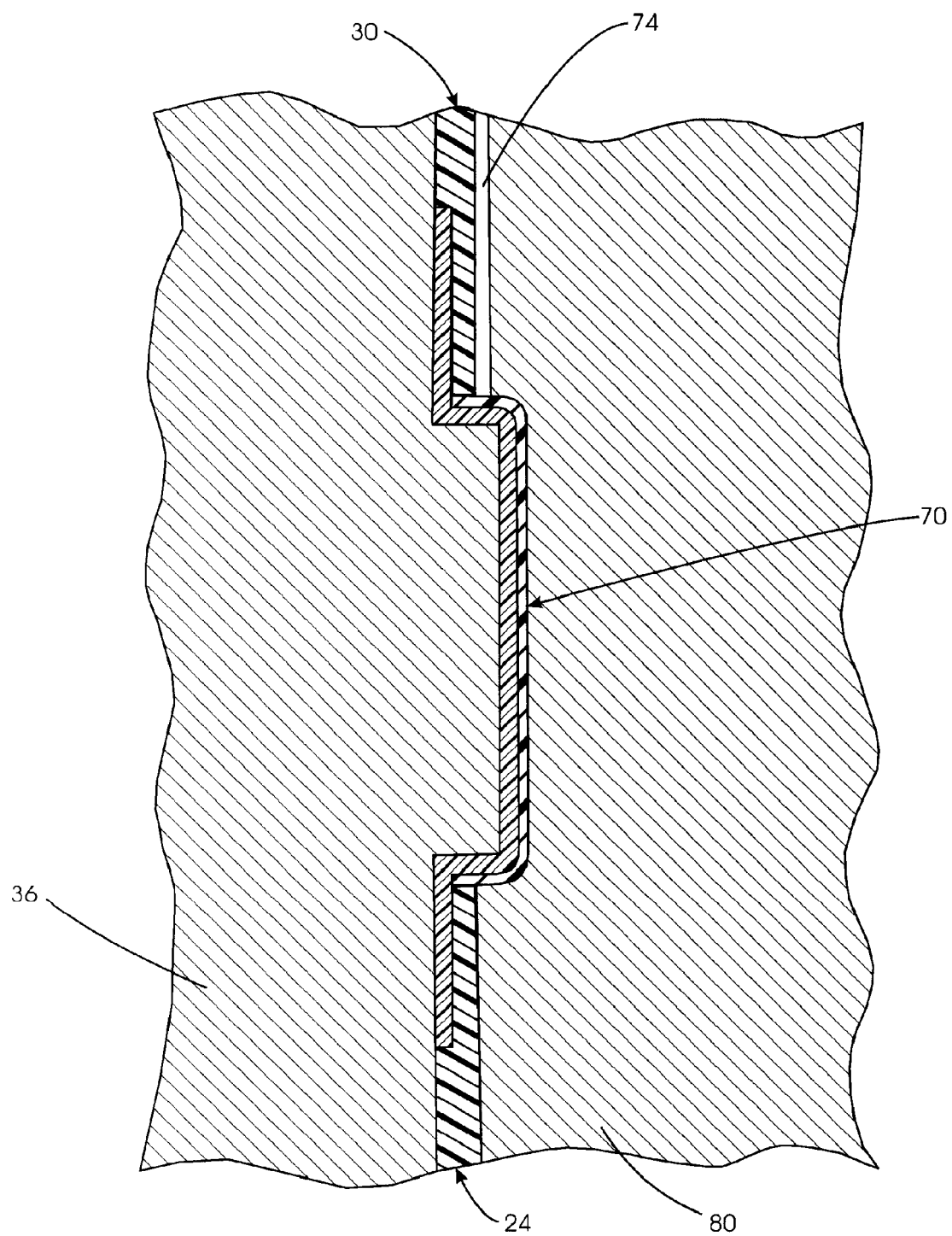
FIG. 7 is an illustration of a mold cooperating with the subassembly to form a mold cavity.
Figure 8:
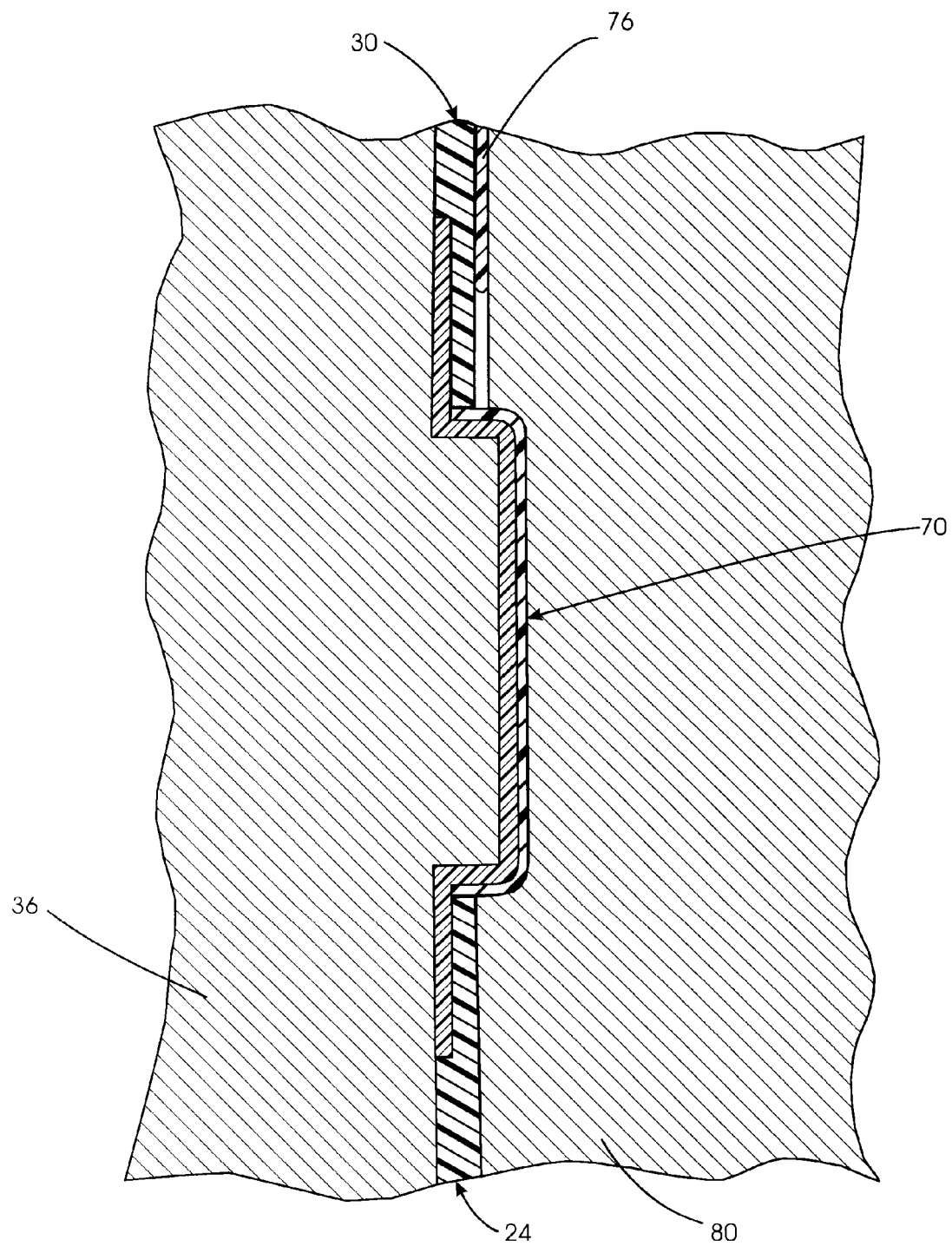
FIG. 8 is a view similar to FIG. 7 showing the introduction of resin into the cavity.

The major panel 12 and bolster 14 form a door panel subassembly 70. As shown in FIG. 7, the door panel subassembly 70 is positioned within a mold forming a second mold cavity 74. The second mold cavity 74 is generally positioned above the first upper door portion 30 of the major panel 12. A second resin 76, referring to FIG. 8, is introduced into the mold cavity 74. Typically, the second resin 76 is injected into second mold cavity 74 at a temperature from about 350° F. to about 440° F. and a pressure from about 200 psi to about 2100 psi. It should be appreciated that these temperature and pressure ranges will vary depending on the materials used. It should be appreciated that the core half 36 and cavity half 48 (illustrated in FIGS. 4-6) may include moveable sections that are individually positionable to form the second mold cavity 74. Alternatively, as is shown, cavity half 48 may be replaced with a substitute cavity half 80 specifically designed to form the second mold cavity 74. The resin, upon cooling, or curing, forms the second upper door portion 32 secured to and above the first upper door portion 30.

In at least one embodiment, the major panel 12 can be made of any suitable resin such as a relatively hard, relatively rigid resin. Typically, useful resins for the major panel 12 are thermoplastic resins. Particularly useful resins for the major panel 12 include, for example, thermoplastic polyurethanes, thermoplastic olefins, polyvinyl chloride, polypropylene, and combinations thereof. More specific examples of useful resins for the major panel 12 include homopolymers and copolymers of polyethylene, homopolymers and copolymers of polypropylene, filled polypropylene, polycarbonate, acrylonitrile butadiene styrene, mixed acrylonitrile butadiene styrene and polycarbonate, and combinations thereof.

Also, in certain embodiments, the resin that forms the bolster substrate 40 is similar to or the same as the resin that forms panel 12 to help ensure that they will bond to each other for securing the bolster 14 to the major panel 12. Alternatively, or additionally, projections (not shown) in the major panel 12 could be molded through the bolster 14, and/or other means could be used to secure, or help secure, the bolster 14 to the major panel 12.

The bolster cover 42 can be made of any suitable relatively non-rigid relatively soft skin layer material such as TPE, TEE, EPDM, any other suitable elastomeric materials, or a fabric material such as cloth, vinyl, or leather. The bolster cover 42 is typically made of a material that will have a rebound force so that the bolster cover can compress during molding (FIG. 8) and expand after the molding. In some instances, the cover 42 will comprise a layer of foam (polyurethane, polypropylene, polyethylene, etc.) between the skin layer and the bolster substrate 40.

The major panel 12 and the second upper panel portion 32 are made of different materials to provide a different appearance and/or feel between the lower door panel portion 24 and the upper door panel portion 26. The second upper panel portion 32 can be made of any suitable resin. Typically useful resins for the second upper panel portion 32 are thermoplastic resins. Useful resins for the second upper panel portion 32 include, for example, thermoplastic polyurethanes, thermoplastic olefins, polyvinyl chloride, polypropylene, and combinations thereof. More specific examples of useful resins for the second upper panel portion 32 include homopolymers and copolymers of polyethylene, homopolymers and copolymers of polypropylene, polycarbonate, acrylonitrile butadiene styrene, mixed acrylonitrile butadiene styrene and polycarbonate, and combinations thereof. Since the second upper door panel portion 32 is usually softer than the remainder of the door panel portions 24 and 30 the resin for the second upper panel portion 32 may also comprise one or more elastomers. Examples of useful elastomers for the second upper panel portion 32 include thermoplastic elastomers, styrene-ethylene-butylene-styrene elastomers, blocked copolymer thermoplastic elastomers, polyolefin-based elastomers, foamed thermoplastic elastomers, and combinations thereof. Also, the second resin could result in a different color than the first resin. In at least one embodiment, the first resin comprises TPO and the second resin comprises TPE.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making an automobile interior door panel, said method comprising:
    a) providing a molding tool comprising a first mold half and a second mold half, the first and second mold halves cooperating to form a first mold cavity;
    b) providing a bolster within the first mold cavity, the first mold half, the second mold half, and the bolster cooperating to form a second mold cavity;
    c) introducing a first resin into the second mold cavity, the resin, upon cooling, forming a door panel sub assembly, the door panel sub assembly comprising a door panel portion secured to the bolster, the door panel portion having a first upper door panel portion above the bolster and a lower door panel portion below the bolster;
    d) providing the door panel sub assembly within the first mold half and a third mold half, the first mold half, the third mold half, and the door panel sub assembly forming a third mold cavity; and
    e) introducing a second resin less rigid that the first material into the third mold cavity, the second resin, upon cooling, forming a second upper door panel portion over and secured to the first upper door panel portion, wherein the bolster includes a peripheral flange, the first upper door panel portion including a first main panel portion extending away from the flange and a first finger portion extending over the flange and the lower door panel portion including a second main panel portion extending away from the flange and a second finger portion extending over the flange.

2. The method of claim 1 wherein the first resin comprises a thermoplastic resin.

3. The method of claim 2 wherein the first resin is selected from the group consisting of thermoplastic polyurethanes, thermoplastic olefins, polyvinyl chloride, polypropylene, and combinations thereof.

4. The method of claim 1 wherein the second resin comprises a thermoplastic resin.

5. The method of claim 4 wherein the second resin is selected from the group consisting of homopolymers and copolymers of polyethylene, homopolymers and copolymers of polypropylene, filled polypropylene, thermoplastic olefins, thermoplastic urethanes, polycarbonate, acrylonitrile butadiene styrene, mixed acrylonitrile butadiene styrene and polycarbonate, and combinations thereof.

6. The method of claim 1 wherein the bolster comprises a rigid substrate and a decorative portion secured to the rigid substrate, the decorative portion being made of a soft material less rigid than the material of the rigid substrate.

7. The method of claim 1 wherein the door panel portion is substantially flat such that the first upper door panel portion and the lower door panel portion extend substantially along the same plane.

8. The method of claim 1 wherein the first and second main panel portions and the first and second finger portions are in contact with the flange.

9. The method of claim 7 wherein the first upper panel portion is approximately one-half the thickness of the lower panel portion.

10. The method of claim 1 wherein the first upper door panel portion has a thickness of 1-5 mm and the lower door panel portion has a thickness of 1-5 mm.

11. The method of claim 10 wherein the second upper door panel portion has a thickness of 0.5-3 mm.

12. The method of claim 1 where an opening is formed between the first upper door panel portion and the lower door panel portion, the bolster covering the opening.

13. The method of claim 1 wherein the bolster, the lower door panel and the second upper door panel portion all have an appearance surface that faces a vehicle occupant when the automobile interior door panel is installed in a vehicle compartment.

14. A method of making an automobile interior door panel, said method comprising:
    a) positioning a bolster within a first mold cavity of a molding tool, the first mold cavity and the bolster forming a second mold cavity;
    b) injecting a first resin into the second mold cavity to form a door panel sub assembly, the door panel sub assembly comprising a door panel portion secured to the bolster, the door panel portion having a first upper door panel portion generally above the bolster and a lower door panel portion generally below the bolster, the first resin is selected from the group consisting of thermoplastic olefins, polyvinyl chloride, polypropylene, and combinations thereof;
    c) positioning the door panel sub assembly within a third mold cavity, the third mold cavity and the door panel sub assembly forming a fourth mold cavity; and
    d) injecting a second resin less rigid that the first resin into the fourth mold cavity to form a second upper door panel portion over and secured to the first upper door panel portion to form an automotive interior door panel, wherein the bolster comprises a rigid substrate and a decorative cover portion secured to the rigid substrate, the decorative cover portion being made of a soft material less rigid than the first material, wherein the bolster includes a peripheral flange, the first upper door panel portion including a first main panel portion extending away from the flange and a first finger portion extending over the flange and the lower door panel portion including a second main panel portion extending away from the flange and a second finger portion extending over the flange.

15. The method of claim 14 wherein the first mold cavity comprises the cooperation of a first mold half and a second mold half of a molding tool, and wherein the first resin is injected into the first mold cavity at a temperature from about 350° F. to about 440° F. and a pressure of about 200 psi to about 2100 psi.

16. The method of claim 15 wherein the third mold cavity comprises the cooperation of the first mold half and a third mold half, and wherein the second resin is injected into the second mold cavity at a temperature from about 350° F. to about 440° F. and a pressure of about 200 psi to about 2100 psi.

* * * * *

UNITED STATES PATENT AND TRADEMARK OFFICE
CERTIFICATE OF CORRECTION

PATENT NO. : 7,572,401 B2  Page 1 of 1
APPLICATION NO. : 11/162618
DATED : August 11, 2009
INVENTOR(S) : Cowelchuk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 733 days.

Signed and Sealed this

Fourteenth Day of December, 2010

David J. Kappos
*Director of the United States Patent and Trademark Office*